(12) United States Patent
Casenave et al.

(10) Patent No.: US 7,926,556 B2
(45) Date of Patent: Apr. 19, 2011

(54) PROCESS FOR THE MANUFACTURE OF A HEAT EXCHANGER, INCLUDING A SURFACE TREATMENT, AND HEAT EXCHANGER THUS OBTAINED

(75) Inventors: Christian Casenave, La Suze sur Sarthe (FR); Frederic Meslin, Muzillac (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 568 days.

(21) Appl. No.: 11/658,724

(22) PCT Filed: Jul. 27, 2005

(86) PCT No.: PCT/FR2005/001961
§ 371 (c)(1),
(2), (4) Date: Jan. 29, 2007

(87) PCT Pub. No.: WO2006/024749
PCT Pub. Date: Mar. 9, 2006

(65) Prior Publication Data
US 2009/0166012 A1    Jul. 2, 2009

(30) Foreign Application Priority Data

Jul. 30, 2004  (FR) ...................... 04 08459

(51) Int. Cl.
*F28F 13/18*    (2006.01)
*B23K 1/20*    (2006.01)

(52) U.S. Cl. .......................... 165/133; 228/183; 228/203

(58) Field of Classification Search .................. 165/133; 228/183, 203
See application file for complete search history.

(56) References Cited

U.S. PATENT DOCUMENTS

| 4,726,886 | A | * | 2/1988 | Kaneko et al. | 165/148 |
| 5,042,574 | A | | 8/1991 | Cottone et al. | |
| 5,201,119 | A | * | 4/1993 | Mizuno et al. | 29/890.047 |
| 5,544,698 | A | * | 8/1996 | Paulman | 165/133 |
| 6,568,465 | B1 | | 5/2003 | Meissner et al. | |
| 6,929,705 | B2 | * | 8/2005 | Myers et al. | 148/243 |
| 2002/0001718 | A1 | * | 1/2002 | Veerasamy | 428/408 |

FOREIGN PATENT DOCUMENTS

| EP | 0 409 130 A | 1/1991 |
| EP | 0 449 459 A | 10/1991 |
| EP | 1 201 788 A | 5/2002 |
| JP | 01130784 A | * 5/1989 |

* cited by examiner

*Primary Examiner* — Allen J Flanigan
(74) *Attorney, Agent, or Firm* — Howard & Howard Attorneys PLLC

(57) ABSTRACT

Process for the manufacture of a heat exchanger, in particular an evaporator, comprising the preparation, assembling and brazing of components of the heat exchanger, the brazing being carried out under given temperature conditions. Prior to the assembling and to the brazing, a surface treatment operation is carried out that includes applying a coating to a chosen component, the coating including a support, at least one active agent suitable for giving the heat exchanger chosen properties during its operation, and at least one thermal protection agent suitable for enabling the coating to withstand the brazing temperature conditions.

16 Claims, 4 Drawing Sheets

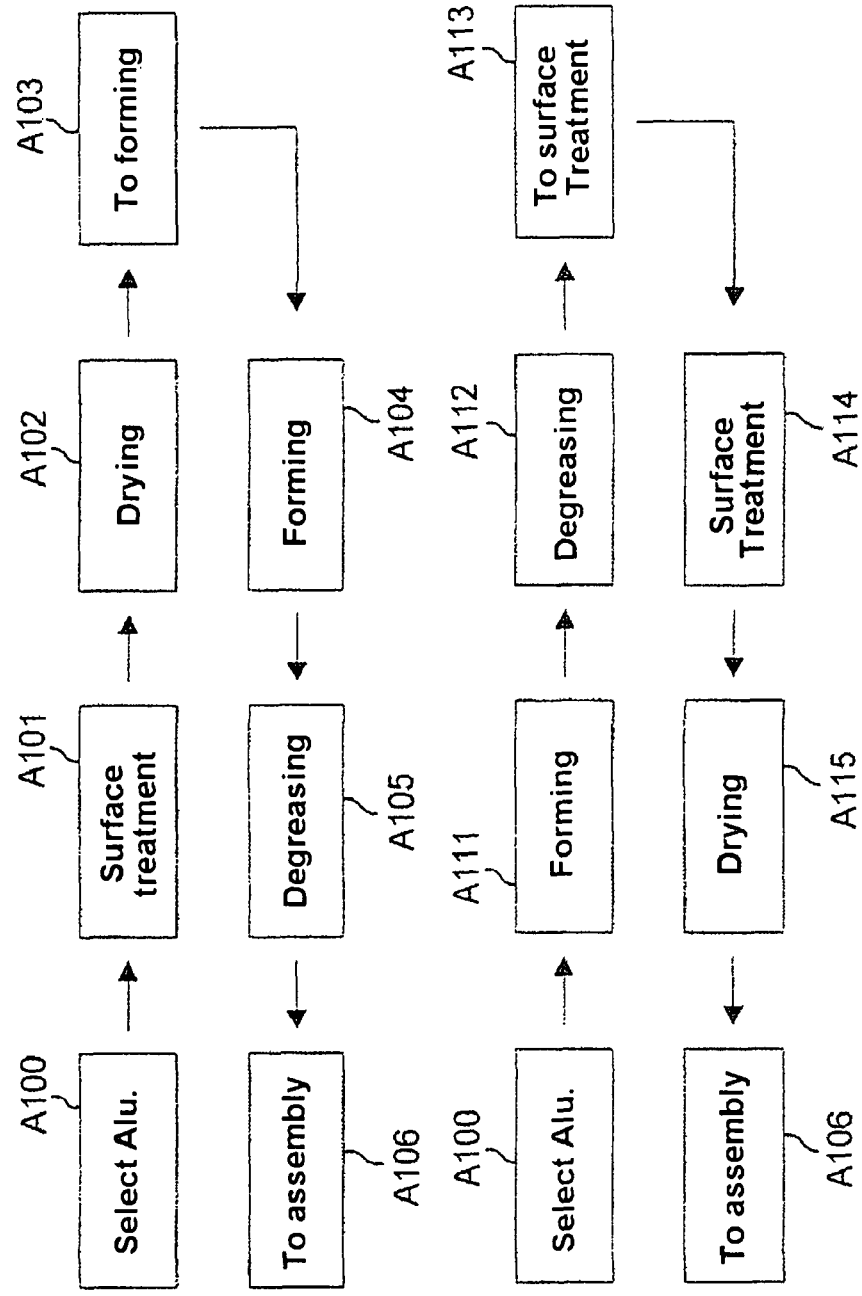

PROCESS FOR THE MANUFACTURE OF A HEAT EXCHANGER, INCLUDING A SURFACE TREATMENT, AND HEAT EXCHANGER THUS OBTAINED

CROSS-REFERENCE TO RELATED APPLICATION

This application is a national stage application of and claims priority to and all the advantages of International Application No. PCT/FR2005/001961, filed pursuant to 35 U.S.C. §371 on Jul. 27, 2005, which claims priority to French Application No. 0408459 filed Jul. 30, 2004.

BACKGROUND OF THE INVENTION

The invention relates to heat exchangers and to the manufacturing processes that are dedicated thereto.

The invention relates more particularly to a process for manufacturing a heat exchanger of the brazed type, in which a surface treatment is carried out.

Such a process is used for example for manufacturing evaporators used in motor vehicle air-conditioning circuits.

The invention also relates to a heat exchanger manufactured according to this manufacturing process, in particular an evaporator for a motor vehicle air-conditioning circuit.

Surface treatments designed to give the surface of a heat exchanger specific properties are known. For example, the surface in contact with the ambient air is treated so as to prevent or suppress the growth of microorganisms on this surface, these microorganisms themselves being a source of or environment conducive to perceptible smells during operation of this exchanger.

The surface treatment is generally carried out by immersing the heat exchanger in a series of baths alternately containing active agents, intended to give the surface the desired properties, and rinsing liquids, intended to prepare the heat exchanger for the next bath. It is also known practice to apply a coating by spraying.

Thus, document U.S. Pat. No. 5,376,411 suggests applying a coating to a heat exchanger by immersing it in a bath for producing a hydrophilic film and then applying an antimicrobial agent to this coating before the latter has completely dried.

Moreover, document EP 1 201 788 discloses the application of two films having anticorrosive and hydrophilic properties to the surface of an aluminum heat exchanger.

It should be noted that in both these documents the application of a coating is performed only once the heat exchanger has been assembled and brazed. This is because the coatings described are not capable of withstanding high temperatures, such as those encountered during the hard brazing process. Hard brazing is brazing carried out at temperatures above 400° C. and possibly up to 630° C.

These manufacturing processes and the heat exchangers that result therefrom have many drawbacks. In the first place, since the surface treatment is carried out after the brazing, it is necessary to treat the heat exchanger as a single part. This involves the treatment of surfaces that would not necessarily require it, and therefore a loss of productivity.

Secondly, the requirement of treating the entire heat exchanger means that there is no control of the amount of coating applied to each component of the heat exchanger.

Finally, the need to prepare the heat exchanger and to remove the brazing residues before the baths or the spraying tends to reduce the productivity of the production line.

SUMMARY OF THE INVENTION

The subject of the present invention is a process for manufacturing a heat exchanger that remedies these drawbacks.

For this purpose, the invention proposes a process for the manufacture of a heat exchanger, in particular an evaporator, comprising the preparation, assembly, and brazing of components of the heat exchanger, the brazing being carried out under given temperature conditions, characterized in that it includes, prior to the assembling and to the brazing, a surface treatment operation consisting in applying a coating to a chosen component, said coating comprising a support, at least one active agent suitable for giving the heat exchanger chosen properties during its operation, and at least one thermal protection agent suitable for enabling the coating to withstand the hard brazing temperature conditions.

By carrying out the surface treatment before assembly and brazing of the components of the heat exchanger, it is possible to have a heat exchanger possessing the desired surface properties immediately after the brazing. This allows the heat exchanger production to be simplified by treating components that may be selected.

This process also improves the efficiency of the production line since the risks associated with the surface treatment are reduced to the components undergoing the treatment and no longer to the entire heat exchanger.

In one method of implementing the process of the invention, the active agent is a hydrophilic agent. In a second method of implementing the process of the invention, the active agent is an antimicrobial agent.

The use of these active agents gives the heat exchanger manufactured according to the process of the invention highly beneficial surface properties.

The hydrophilic agent is particularly useful in the case of heat exchangers tending to dehumidify the fluid that it is desired to cool or heat. This active agent prevents water splashes, the water flowing over the surface of the exchanger.

The antimicrobial agent is advantageous in this same type of heat exchanger as it prevents the development, or ensures destruction, of the microbes (bacteria, mold, fungi) that develop as a result of the ambient moisture and that have a tendency to produce unpleasant smells.

In a preferred method of implementing the process of the invention, the coating comprises a support, a hydrophilic agent, an antimicrobial agent and a thermal protection agent. This method of implementing the process of the invention gives the heat exchanger particularly beneficial surface properties. Such a process makes it possible to manufacture a heat exchanger particularly suitable for the requirements of the evaporators used in motor vehicle air-conditioning circuits. This is because evaporators dehumidify the air that passes through them. This has the effect of generating a condensate having deleterious consequences which are controlled by the antimicrobial and hydrophilic agents, as described above.

Advantageously, the thermal protection agent comprises an aluminum bronze and/or a silicon-based binder. The use of a thermal protection agent such as this gives the coating used in the surface treatment of the invention thermal properties that are particularly favorable in the case of soft brazing (with a brazing temperature below 450° C.) or hard brazing and temperature conditions that characterize them. These thermal properties make it possible in particular for the coating to withstand these temperature conditions and to give the heat exchanger the surface properties of the active agents after brazing.

According to another preferred method of implementing the process of the invention, the components of the heat exchanger comprise at least one header, channels for circulating a fluid, and fins in contact with the channels, and the process is characterized in that the surface treatment is carried out on the material of the fins.

Restricting the surface treatment to just the fins allows the production cycle to be reduced, by treating only the components that require the treatment, this restriction also making it possible to make substantial savings in terms of coating and allowing the applied coating thickness to be better controlled.

In a preferred method of implementing the process of the invention, the preparation includes, for each fin, a surface treatment step and a step of forming the fin. In this method of implementation, the surface treatment may be carried out by dipping, by spraying or by coating the strip, either during manufacture of the aluminum strip intended for the manufacture of the fin, or after manufacture of this strip.

In another preferred method of implementing the process according to the invention, the preparation includes, for each fin, firstly a step of forming the fin and secondly the surface treatment. In this other method, the surface treatment may be carried out by dipping or by spraying.

When the surface treatment is carried out during manufacture of the aluminum strip, the invention has the additional advantage of controlling the organic discharges by thermal oxidation of the support. This oxidation is accelerated by the temperature of the strip leaving the rolling production process and by the presence of oxygen in the air. Application of the coating does not impair the longevity owing to its temperature resistance. It has the advantage of drying the coating without the use of additional means. The aluminum strip is then coiled, so as to be transported to a place of use, where it is formed into fins, and these are assembled with the other components of the exchanger.

These methods of implementation give the production line great flexibility in that it is possible, depending on the complexity of the fin forming operation, to carry out the surface treatment before or after the fin forming operation.

The process of the invention may also include a drying step during preparation of the components, and the brazing may furthermore be carried out using the hard brazing protocol, which may be performed in a vacuum or in a controlled atmosphere.

The invention also relates to a heat exchanger manufactured according to a process as described above and comprising components, at least one of which has been subjected to the surface treatment as described above. Furthermore, the heat exchanger according to the invention may comprise at least one header tank, channels for the circulation of a fluid, and fins in contact with the channels, the surface treatment being carried out on the material of the fins.

In a preferred embodiment of the invention, the channels are tubes. In a second preferred embodiment of the invention, the channels consist of a multiplicity of pairs of stacked plates. These two preferred embodiments of the invention make it possible to offer conventional heat exchangers, such as finned tube exchangers or plate/fin exchangers whose surface properties are improved as described above.

Finally, the components of the heat exchanger according to the invention may be made of an aluminum alloy, copper or any other metallic material that can be brazed and this exchanger may be an evaporator used in air-conditioning circuits, more particularly air-conditioning circuits for motor vehicles.

BRIEF DESCRIPTION OF THE DRAWINGS

Other features and advantages of the invention will become more apparent on reading the following description of exemplary embodiments given by way of nonlimiting illustration with reference to the appended figures, in which:

FIG. 3 is a block diagram showing, partially, one step of the process of FIG. 2;

FIG. 4 is a block diagram showing, partially, one step of the process of FIG. 2 according to a preferred method of implementing the process of the invention;

FIG. 5 is a block diagram showing, partially, one step of the process of FIG. 2 according to another preferred method of implementing the process of the invention;

DETAILED DESCRIPTION OF EXEMPLARY EMBODIMENT(S)

Figure 1:
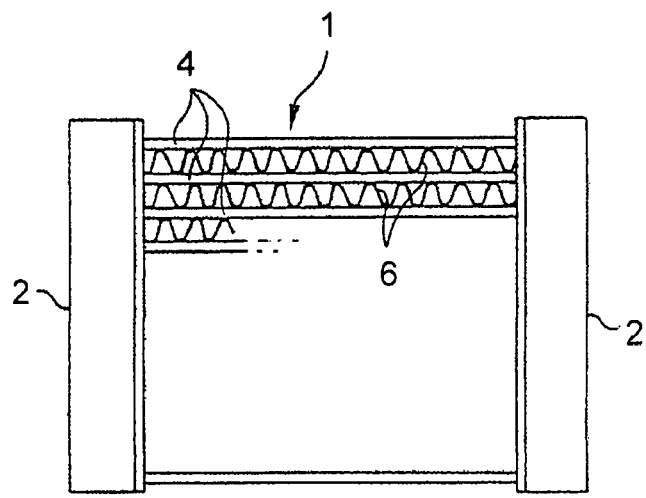
FIG. 1 is a schematic front view of a finned tube heat exchanger manufactured according to the process of the invention, before brazing.

FIG. 1 shows schematically a front view of a heat exchanger 1 manufactured by the process of the invention.

The heat exchanger 1 comprises, as is known, components that include header tanks 2, channels 4 and fins 6 (also known to those skilled in the art as "inserts"). The two header tanks 2 are superposed and brought into communication with each other via the channels 4, which are arranged and aligned and in which a fluid circulates, to which transfer of heat from air passing through the exchanger is intended. The fins 6 are placed between the header tanks 2 transversely to the axis of the channels 4 and are in direct contact with the air external to the exchanger.

The heat exchanger 1 described here was manufactured using the process of the invention, but is presented before the channels 4 and the fins 6 have been brazed. The channels 4 here are flat tubes, but they could also be tubes of circular or oval cross section or of any other shape known to those skilled in the art.

The fins 6 here are corrugated, but they could also be planar or have any shape known to those skilled in the art. They are substantially rectangular in shape and have undergone during their preparation a surface treatment characteristic of the process according to the invention, which treatment will be described later.

Figure 2:
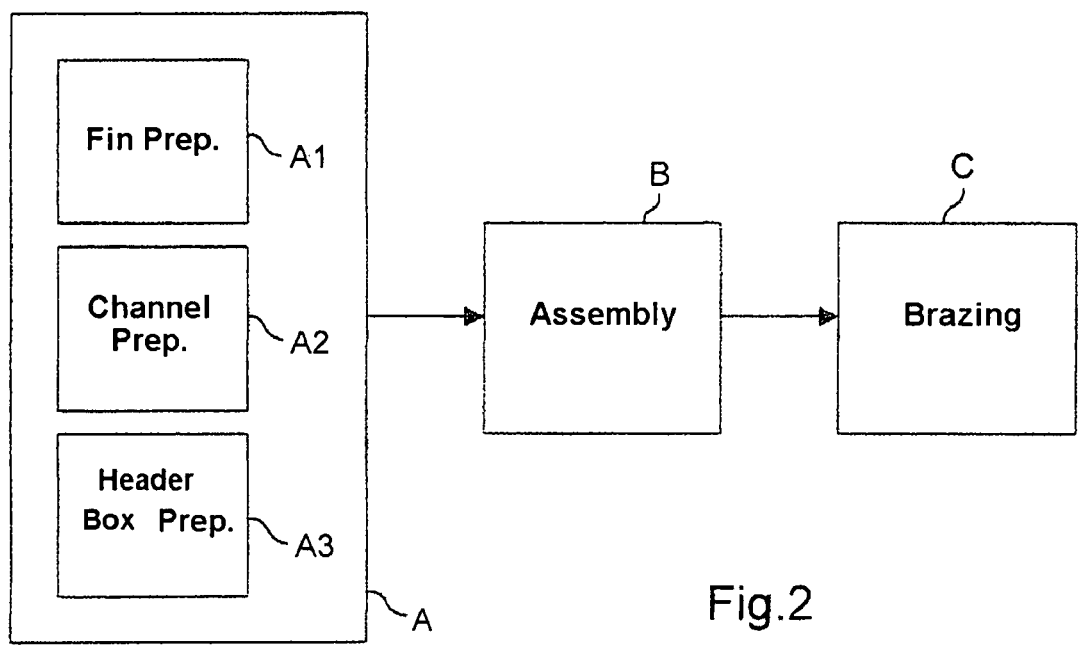
FIG. 2 is a block diagram showing various steps of the process of the invention.

FIG. 2 shows a block diagram of the process of the invention. The process of the invention comprises three steps represented by blocks A, B and C.

Block A corresponds to the step of preparing the components of the exchanger 1. Block A is made up of three sub-blocks A1, A2 and A3 corresponding to three simultaneous steps on the production line. Sub block A1 corresponds to the step of preparing the fins 6, block A2 corresponds to the preparation of the channels 4 and block A3 corresponds to the preparation of the header tanks 2.

Block B corresponds to the step of assembling the components of the exchanger 1. During this step, the header tanks 2, the channels 4 and the fins 6 are assembled with a view to the step represented by block C.

Block C represents the brazing step during which the assembled components following the assembling step are subjected to brazing which, in the example described here, is hard brazing in a controlled atmosphere, possibly up to temperatures of 630° C. and carried out in a furnace. The atmosphere of this furnace contains nitrogen in a chosen amount. This allows the oxidation problems to be controlled and high-quality brazing to be achieved. The brazing could also be soft brazing or any other brazing process known to those skilled in the art.

FIG. 3 is a block diagram illustrating block A2 shown in FIG. 2. Block A2 represents the step of preparing the channels 4 before assembly.

The step represented by block A2 comprises a step A200, a step A201, a step A202 and a step A203.

A raw material is selected in step A200. This is an aluminum alloy material composed of two layers—a core made of an alloy chosen from the 3000 series, for example 3003, and a layer composed of an alloy chosen from the 4000 series, for example 4045 or 4343, which constitutes the filler material forming the braze. In step A201, the raw material undergoes conversion operations so as to give it the shape chosen for the channels 4.

After step A201, step A202 comprises the degreasing of the channels obtained, followed by application to them of a flux to promote brazing. The channels 4 thus obtained are moved to an assembly site during step A203.

Figure 10:
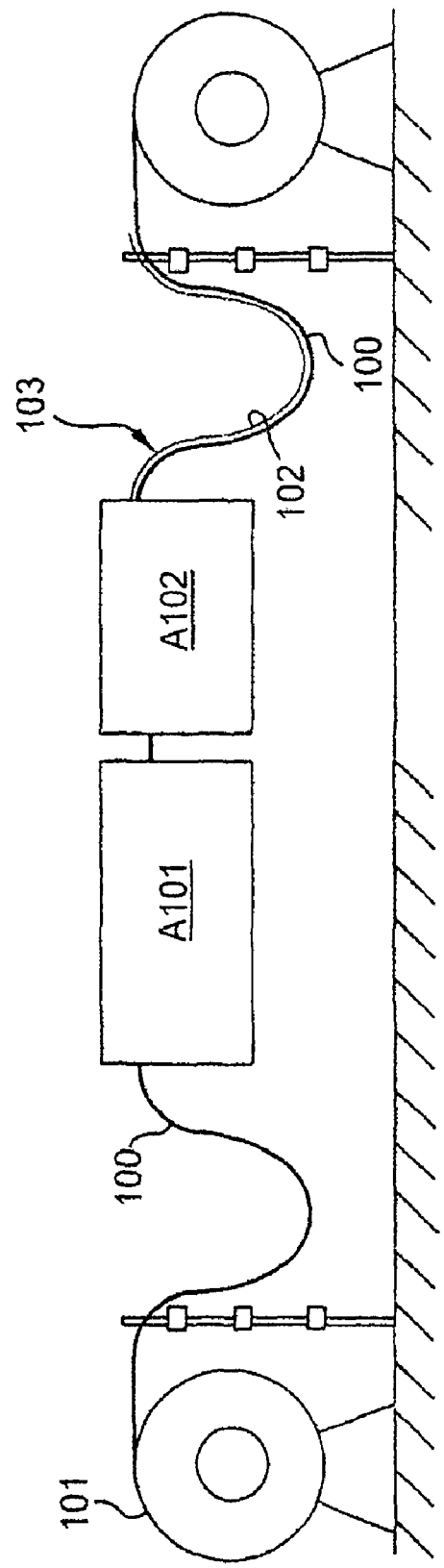
FIG. 10 is a schematic view of part of the block diagram of FIG. 4.

We will now describe part of the process according to a preferred method of implementing the invention with the aid of FIGS. 4 and 10.

As may be seen in FIG. 4, block A1 of the preparation step shown in FIG. 2 comprises a step A101, a step A102, a step A103, a step A104, a step A105 and a step A106.

A raw material 100 is selected for forming the fins during step A100. This is an aluminum alloy chosen from the 3000 series, for example 3003. As may be seen in FIG. 10, this aluminum alloy is supplied as a coil 101. Step A101 consists in applying, to the unreeled surface of the coil 101, a layer of a coating 102 that will be described later.

Figure 7:
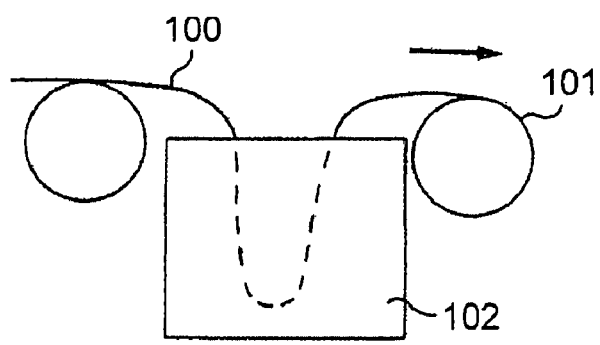
FIG. 7 is a schematic view of an operation of treating the surface of the fins by dipping.
Figure 8:
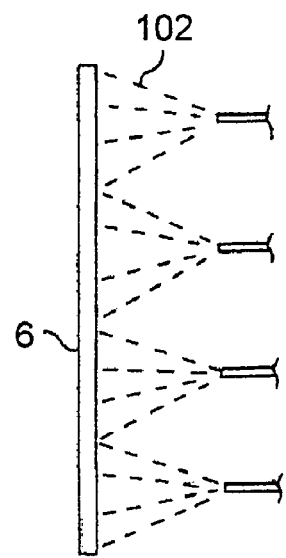
FIG. 8 is a schematic view of an operation for treating the surface of the fins by spraying.
Figure 9:
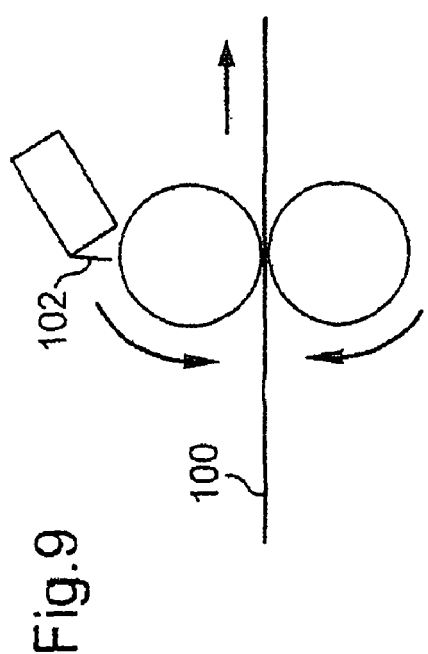
FIG. 9 is a schematic view of an operation of treating the surface of the fins by coating.

The application of the coating 102 is performed here by dipping, as illustrated in FIG. 7. Application could however be carried out by spraying as shown in FIG. 8, or by coating as shown in FIG. 9.

Step A102 consists in drying the coating that has just been applied to the surface of the unreeled raw material 100, thereby giving an intermediate product 103.

The intermediate product 103 obtained after step A102 is reeled up during step A103 and moved to a different sector of the production line. It is then deformed during step A104 so as to give the fins a chosen shape. The fins thus formed are then degreased during the step represented by A105. After this step, the fins obtained are moved to an assembly site during step A106.

The process according to the invention has the advantage of advancing the integration of the surface treatment of the fins 6 on the production line. This may be particularly advantageous where the geometry of the fins 6 obtained after formation thereof does not easily lend itself to uniform application of a coating such as that described in the table below.

| Agent | Composition | Quantity (% by weight of the mixture) |
|---|---|---|
| Support | Xylene + 1-methoxy-2-propyl acetate | 40-50% |
| Surfactant | 7.5% bentone 38 | 2-5% |
| Microbial resistance | Sylosiv A 100 + copper salt | 0.5-2% |
| Silicon based binder | 50% Baysilone P500 resin | 10-20% |
| Heat shield | Aluminum bronze | 30-40% |

As this table shows, the coating used in the example described here comprises a support, two active agents, and a thermal protection agent comprising a binder and a heat shield.

The support is a mixture of xylene and 1-methoxy-2-propyl acetate. This support serves for depositing the coating on the surface of the fins.

One of the two active agents is a 7.5% bentone-based surfactant. This surfactant makes it possible, prior to the brazing, to improve the wettability of the coating, thereby resulting in easier application.

The second active agent is an agent providing resistance to microbial contamination, consisting of a mixture of Sylosiv A 100 impregnated with a copper salt. This gives the brazed exchanger excellent antimicrobial properties.

The thermal protection agent is a mixture of a silicon-based binder, which here is Baysilone P500 resin, and a heat shield, here an aluminum bronze.

The silicon-based binder makes it possible, before brazing, to improve the adhesion of the coating to the surface of the fins. It then allows the coating to withstand the brazing temperature conditions. After brazing, it gives the heat exchanger hydrophilic properties and ensures better adhesion of the coating to the surface. The heat shield is an aluminum bronze, the function of which is to protect the coating during brazing.

Typically, the fins 6 represent about 90% of the total external area of the heat exchanger 1 and are the components whose surfaces are the most highly stressed during its operation. The fact that only the surface of the fins 6 is treated, and not the external surface of the channels 4, as is apparent in the exemplary embodiment described here, therefore gives the heat exchanger 1 optimum surface properties while greatly simplifying the manufacturing process.

FIG. 5 is a block diagram that illustrates partially a second preferred method of implementing the process according to the invention, especially block A1 of FIG. 2. By similarity with the first method of implementation described in FIG. 4, the numerical references have been preserved and the different elements have seen their numbering increased by ten.

This method of implementation comprises step A100, a step A111, a step A112, a step A113, a step A144, a step A115 and step A106.

Step A111 consists in modifying the raw material so as to give it the chosen shape for the fins. Once formed, the raw material is degreased during step A112 and the intermediate product obtained is moved during step A113.

Next, the coating of FIG. 5 is applied to the intermediate product during step A114. This application is carried out here by dipping, but it could also be carried out by spraying. Finally, the fin 6 is obtained after the drying step A115, after applying the coating, and then moved as shown at A106.

This method of implementing the process of the invention makes it possible to obtain a more effective production line when the shape imposed on the fin 6 is geometrically simple.

Figure 6:
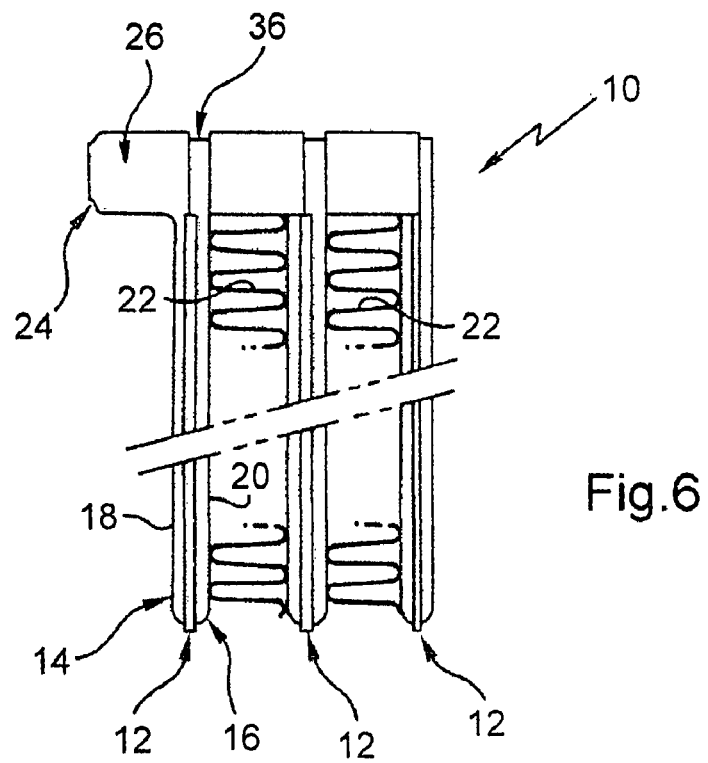
FIG. 6 is a partial side view of a plate evaporator manufactured according to the process of FIG. 2.

FIG. 6 is a partial side view of a plate/fin evaporator 10 manufactured according to the process of the invention. The evaporator 10 comprises a multiplicity of plates 12 that are each formed by assembling a first element 14 and a second element 16 defining, respectively, a face 18 and a face 20. The faces 18 and 20 are generally planar and mutually parallel.

The evaporator 10 further includes a multiplicity of corrugated fins 22 each arranged between two adjacent plates, in contact with a first face 18 of one plate and with a second face 20 of an adjacent plate.

In an upper portion 24, each first element 14 includes two ducts 26 that project outward from the first face 18. Each duct 26 is juxtaposed with a duct 36 that is provided by the second element 16. Each plate 12 thus forms a chamber in which a coolant circulates.

The first and second elements 14 and 16 are advantageously obtained by drawing an aluminum-based metal plate. The fins 22 have undergone the surface treatment described above.

It would be possible to design evaporators manufactured by the process of the invention in which the plates are made in a different way or are replaced with tubes connected to header tanks.

The exchangers of the invention may be produced in particular in the form of a radiator for cooling a motor vehicle engine or a radiator for heating the passenger compartment of a motor vehicle just as in the embodiment of exchangers for motor vehicle air-conditioning circuits.

The invention is not limited to the embodiments that have been described above, merely by way of example; rather, it encompasses all alternatives that a person skilled in the art might envision, such as for example carrying out the surface treatment during manufacture of the aluminum strip intended for manufacturing the fin, after this strip has been rolled but before it is coiled up.

The invention claimed is:

1. A process for the manufacture of a heat exchanger, in particular an evaporator, comprising the preparation, assembling and brazing of components of the heat exchanger, the brazing being carried out under given temperature conditions, characterized in that it includes, prior to the assembling and to the brazing, a surface treatment operation consisting in applying a coating to a chosen component, said coating comprising a support, at least one active agent suitable for giving the heat exchanger chosen properties during its operation and comprising a hydrophilic agent and an antimicrobial agent, and at least one thermal protection agent suitable for enabling the coating to withstand the brazing temperature conditions and comprising an aluminum bronze and a silicon-based binder.

2. The process as claimed in claim 1, in which the components of the heat exchanger comprise at least one header, channels for circulating a fluid, and fins in contact with the channels, characterized in that the surface treatment is carried out on the material of the fins.

3. The process as claimed in claim 2, characterized in that the preparation includes, for each fin, a surface treatment step and a step of forming the fin.

4. The process as claimed in claim 3, characterized in that the surface treatment is carried out by dipping.

5. The process as claimed in claim 3, characterized in that the surface treatment is carried out by spraying.

6. The process as claimed in claim 3, characterized in that the surface treatment is carried out by coating.

7. The process as claimed in claim 2, characterized in that the preparation includes a drying step.

8. The process as claimed in claim 1, characterized in that the brazing is hard brazing carried out in a controlled atmosphere at a temperature above 400° C. and substantially at 630° C.

9. The process as claimed in claim 1, characterized in that the brazing is hard brazing carried out in a vacuum.

10. A heat exchanger, characterized in that it is manufactured by a process as claimed in one of the preceding claims and comprises components, at least one of which has been subjected to the surface treatment as claimed in claim 1.

11. The heat exchanger as claimed in claim 10, characterized in that the components comprise at least one header, channels for the circulation of a fluid, and fins in contact with the channels, and in that the surface treatment is carried out on the material of the fins.

12. The heat exchanger as claimed in claim 11, characterized in that the channels are tubes.

13. The heat exchanger as claimed in claim 12, characterized in that the channels are plates.

14. The heat exchanger as claimed in claim 10, characterized in that the components are made of an aluminum alloy.

15. The heat exchanger as claimed in claim 10, characterized in that the heat exchanger is an air-conditioning circuit evaporator.

16. A process for the manufacture of a heat exchanger, in particular an evaporator, comprising the preparation, assembling and brazing of components of the heat exchanger, the brazing being carried out under given temperature conditions, characterized in that it includes, prior to the assembling and to the brazing, a surface treatment operation consisting in applying a coating to a chosen component, said coating comprising a support, at least one active agent suitable for giving the heat exchanger chosen surface properties that control deleterious consequences of condensate generated thereon during its operation and comprising a hydrophilic agent and an antimicrobial agent, and at least one thermal protection agent suitable for enabling the coating to withstand the brazing temperature conditions and comprising an aluminum bronze and a silicon-based binder.

* * * * *